(12) United States Patent
Sutton et al.

(10) Patent No.: US 9,422,751 B1
(45) Date of Patent: Aug. 23, 2016

(54) LOCKOUT DEVICE FOR A CHAIN WHEEL OPERATED VALVE

(71) Applicant: Roto Hammer Industries Inc., Tulsa, OK (US)

(72) Inventors: Craig T. Sutton, Tulsa, OK (US); Katherine J. Sutton, Tulsa, OK (US); Steven Sweeden, Tulsa, OK (US)

(73) Assignee: Roto Hammer Industries Inc., Tulsa, OK (US)

( * ) Notice: Subject to any disclaimer, the term of this patent is extended or adjusted under 35 U.S.C. 154(b) by 119 days.

(21) Appl. No.: 14/013,880

(22) Filed: Aug. 29, 2013

(51) Int. Cl.
*E05B 67/38* (2006.01)
*F16K 35/00* (2006.01)
*F16K 35/06* (2006.01)

(52) U.S. Cl.
CPC ............... *E05B 67/38* (2013.01); *F16K 35/00* (2013.01); *F16K 35/06* (2013.01)

(58) Field of Classification Search
USPC .................. 70/14, 18, 53, 56, 58, 63, 175
See application file for complete search history.

(56) References Cited

U.S. PATENT DOCUMENTS

| | | | | |
|---|---|---|---|---|
| 2,180,117 A | * | 11/1939 | Lipsis | B62H 5/003 109/51 |
| 3,817,064 A | * | 6/1974 | Sallee | 70/58 |
| 4,012,930 A | * | 3/1977 | Benson | B62H 5/003 70/168 |
| 4,474,116 A | * | 10/1984 | Castenada et al. | 70/63 |
| 4,811,577 A | * | 3/1989 | Webster | E05B 67/003 70/14 |
| 4,883,191 A | * | 11/1989 | Christensen | B66D 3/26 220/890 |
| 5,219,384 A | * | 6/1993 | Elsfelder et al. | 70/18 |
| 5,595,073 A | * | 1/1997 | Sullivan | 70/18 |
| 5,697,741 A | * | 12/1997 | Harris | B60P 3/12 24/116 R |
| 5,956,980 A | * | 9/1999 | Jenkins, Jr. | 70/18 |
| 6,494,065 B2 | | 12/2002 | Babbitt, III | |
| 7,000,292 B2 | * | 2/2006 | Beaudoin et al. | 70/53 |
| 7,891,219 B1 | * | 2/2011 | Gogel | 70/56 |

* cited by examiner

*Primary Examiner* — Christopher Boswell
(74) *Attorney, Agent, or Firm* — GableGotwals

(57) ABSTRACT

The lockout device has a body with one or more continuous sidewalls, an open end and a bottom defining an interior volume. It also has a lid pivotally attached to at least one of the sidewalls and moveable between an open and closed position. The lid is located to cover at least a portion of the open end of the body when in the closed position. The device also has a closure mechanism capable of holding the lid in a closed position. A pin extends at a downward angle from one of the side across a gap in the lid.

9 Claims, 4 Drawing Sheets

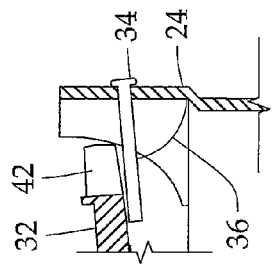
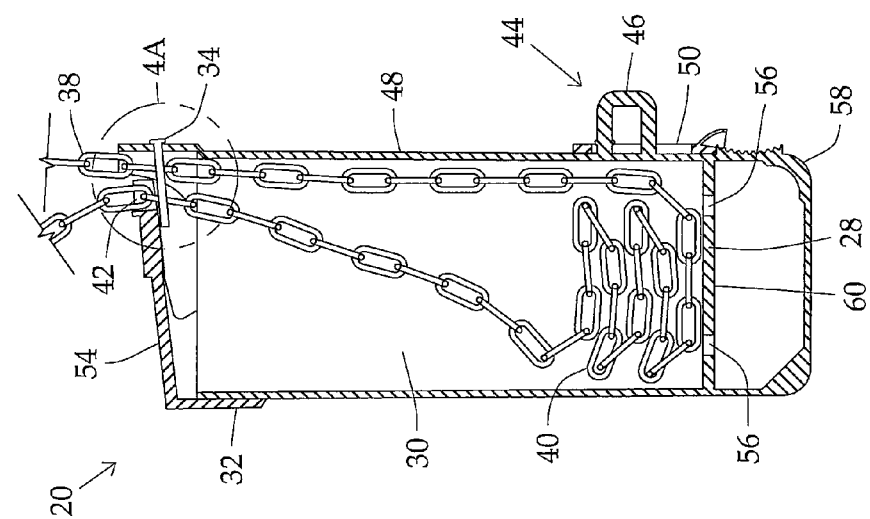
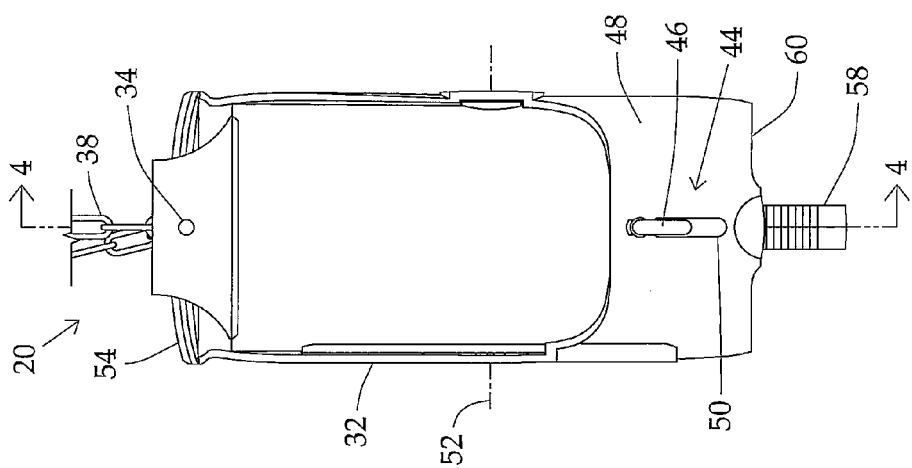

LOCKOUT DEVICE FOR A CHAIN WHEEL OPERATED VALVE

FIELD OF THE INVENTION

The present invention relates generally to a lockout device for a chain wheel operated valve. More particularly, the present invention relates to device that can secure and contain a portion of a chain from a chain wheel valve operator thus locking the operator in its current position.

BACKGROUND OF THE INVENTION

In industrial settings valves often have to be located overhead and out of reach of workers. In order to open and close these valves they are equipped with a chain wheel valve operator sometimes referred to as a chain wheel. This is a wheel interconnected with the valve stem. A chain loop runs over the wheel and engages with the wheel. The chain also hangs down low enough so that it is within reach of a worker standing on the ground below the valve. The worker can then turn the wheel and operate the valve by pulling on one side of the chain or the other. This allows the worker to open or close the valve depending on which side of the chain loop they are pulling on.

One of the requirements for industrial facilities is to be able to lockout all sources of energy to a system prior to working on the system, commonly known as "lockout tagout". This includes locking out electrical as well as hydraulic and pneumatic power sources. It also requires the ability to stop the flow of liquids and gases that might be processed in the system. If these items are not locked out, another worker may come into the area and turn on one of these power sources or open the flow of one of these liquids or gases. This could result in severe bodily injury or even death of the worker working on the system.

As can be imagined, locking out a valve operated by a chain wheel can be difficult. The wheel and valve are located out of reach of the worker. Thus it would be necessary to climb up to the valve or chain wheel to lock it out directly. The other option would be to somehow lock up the loop of chain hanging into the reach of the worker. Aside from locking the chain to a fixed structure, locking the chain by itself is difficult. For this reason other devices for immobilizing the chain are found in the prior art. However these tend to be large and rather cumbersome devices.

What is needed is a compact efficient device to lockout and tagout these chain wheels.

BRIEF SUMMARY OF THE INVENTION

The lockout device of the present invention has a body with one or more continuous sidewalls, an open end and a bottom defining an interior volume. It also has a lid pivotally attached to at least one of the sidewalls and moveable between an open and closed position. The lid is located to cover at least a portion of the open end of the body when in the closed position. The device also has a closure mechanism capable of holding the lid in a closed position. A pin extends at a downward angle from one of the side across a gap in the lid.

The present invention provides a compact and efficient device for locking out and tagging out a chain wheel operated valve.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 3 is a front view of the preferred embodiment of the present invention in use in the closed position;

FIG. 4 is a sectional view showing the interior of the preferred embodiment of the present invention in use in the closed position;

FIG. 4A is a close up of the pin and lid from FIG. 4;

DETAILED DESCRIPTION OF THE PREFERRED EMBODIMENT(S)

Figure 1:
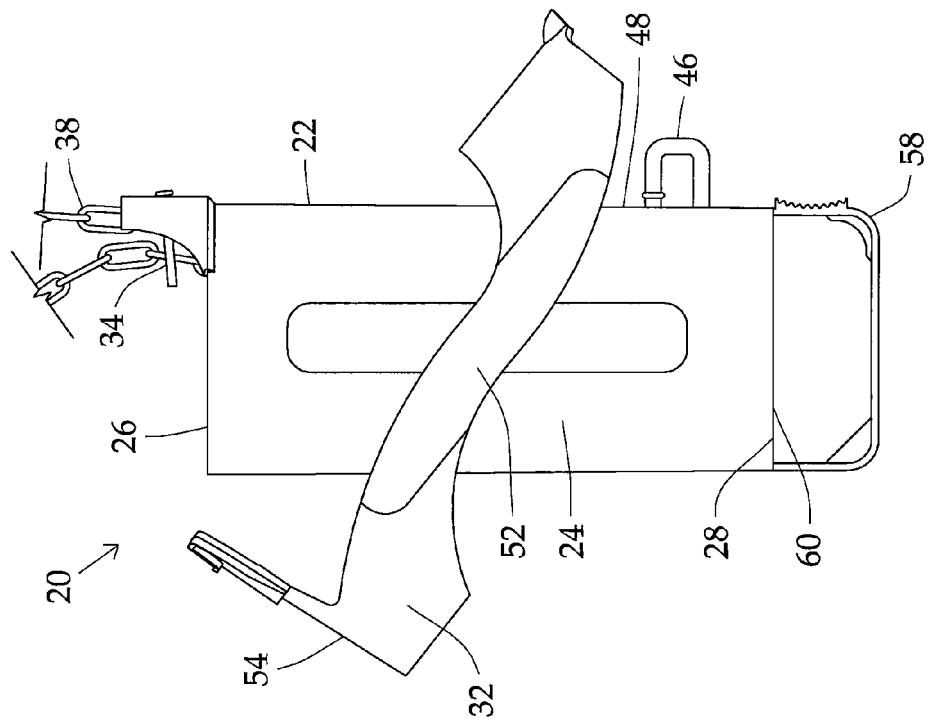
FIG. 1 is a side view of the preferred embodiment of the present invention in use in the closed position.

Turning now to the drawings wherein like reference characters indicate like or similar parts throughout, FIG. 1 through 6 illustrate the preferred embodiment of the present invention. The lockout device 20 has a body 22 with one or more continuous sidewalls 24, an open end 26 and a bottom 28 defining an interior volume 30. In the preferred embodiment there is only one continuous sidewall 24 forming a cylinder. However this shape could be replaced by other geometric shapes and still fall within the scope of the present invention.

There is a pin 34 extending from one of the sidewalls 24 of the device 20. In the preferred embodiment the pin 34 has a downward angle 36 relative to the sidewall 24. See FIG. 4A. It is preferred that the angle 36 of the pin 34 relative to the sidewall 24 be less than 90 degrees. More specifically it is preferred the angle 36 fall within the range of 85 to 40 degrees relative to the sidewall 24.

Figure 2:
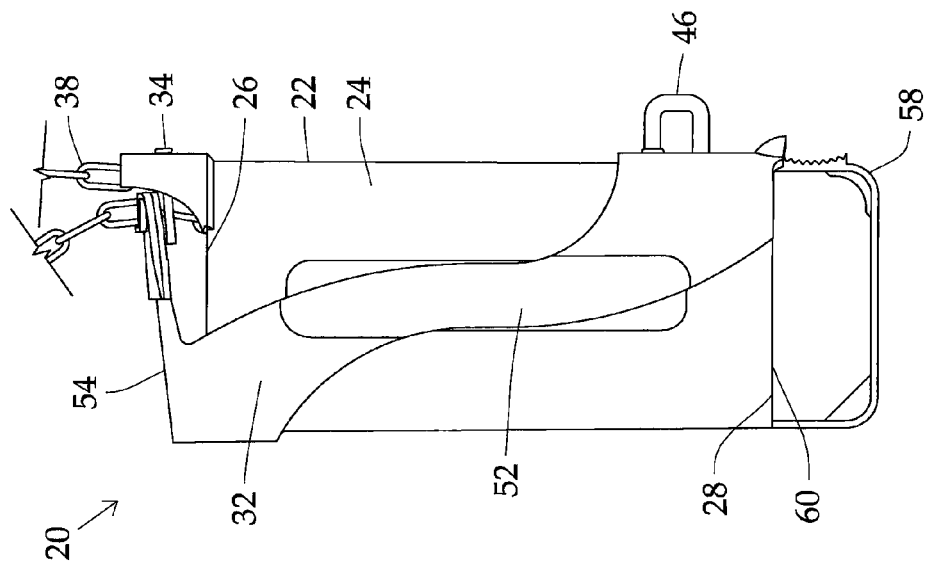
FIG. 2 is a side view of the preferred embodiment of the present invention in use in the open position.
Figure 6:
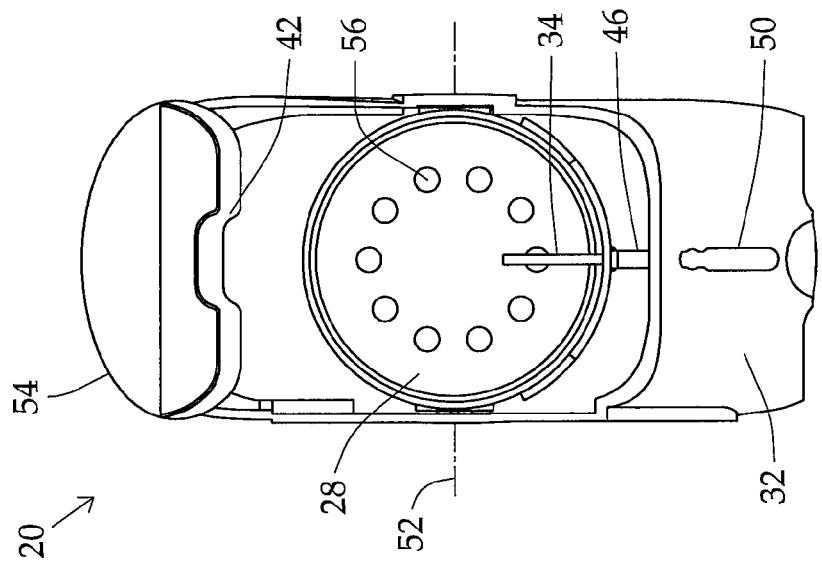
FIG. 6 is a top view of the preferred embodiment of the present invention in the open position.
Figure 5:
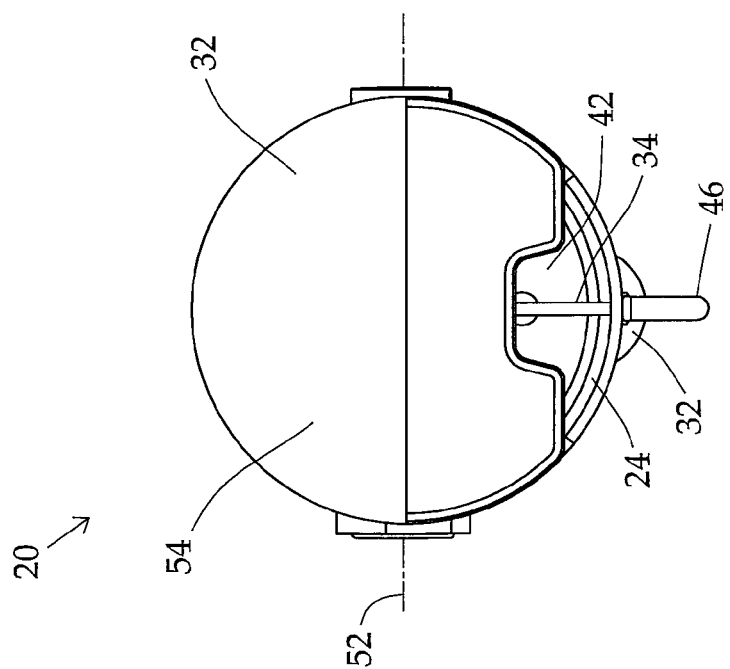
FIG. 5 is a top view of the preferred embodiment of the present invention in the closed position.

The lockout device 20 also has a lid 32 that is pivotally connected to the body 22. FIGS. 1, 3, 4 and 5 show the lockout device 20 in a closed position locking a valve chain 38. FIGS. 2 and 6 show the lockout device 20 in an open position. As can be seen best in FIG. 4 the excess length 40 of the chain 38 can be stored in the interior volume 30. When in use both sides of the loop of valve chain 38 pass through a gap 42 between the lid 32 and the sidewall 24. The pin 34 is aligned with the gap 42. When in the locked position the pin 34 passes through a link 44 of each side of the loop of valve chain 38. The lid 32 prevents the chain 38 from sliding off of the pin 34. Thus in the preferred embodiment the pin 34 extends across the gap 42 and under the lid 32.

The lockout device 20 also has a closure mechanism 44 capable of holding the lid 32 stationary relative to the body 22. In the preferred embodiment as seen in FIGS. 1-6, the locking mechanism has a loop 46 extending from an exterior surface 48 of the body 22. The lid 32 has an aperture 50 sized and located to surround the loop 46 in the closed position. Thus the lockout device can be positively secured or locked in the closed position by placing a lockout-tagout hasp or padlock through the loop 46 while the lid 32 is in the closed position. Other types of closure mechanisms 44 may also be used with the present invention.

Figure 7:
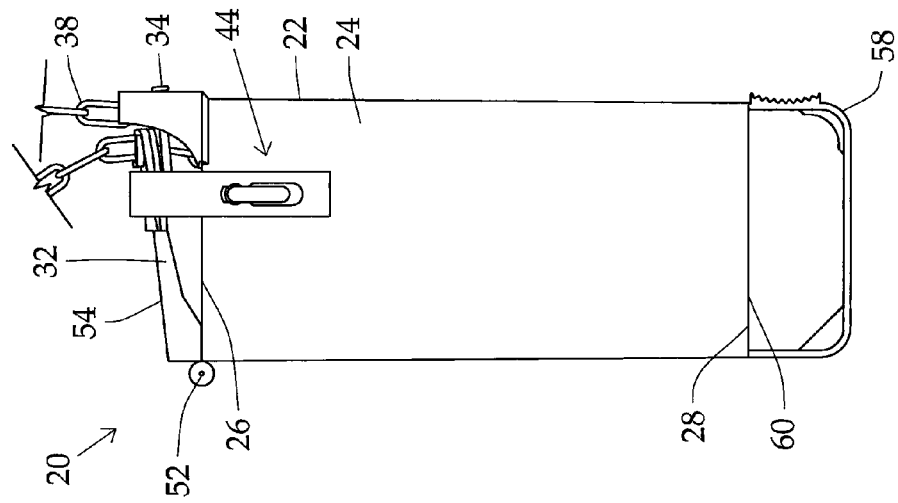
FIG. 7 is an alternate embodiment of the present invention in the closed position.

While the preferred embodiment of the lockout device 20 as seen in FIGS. 1-6 has its axis of pivot 52 located between the closure mechanism 44 and the portion 54 of the lid 32 that extends across the open end 26 of the body 22, other configurations are possible. Such as placing the closure mechanism 44 between the axis of pivot 52 and the portion 54 of the lid 32 that extends across the open end 26 of the body 22. See FIG. 7.

Figure 8:
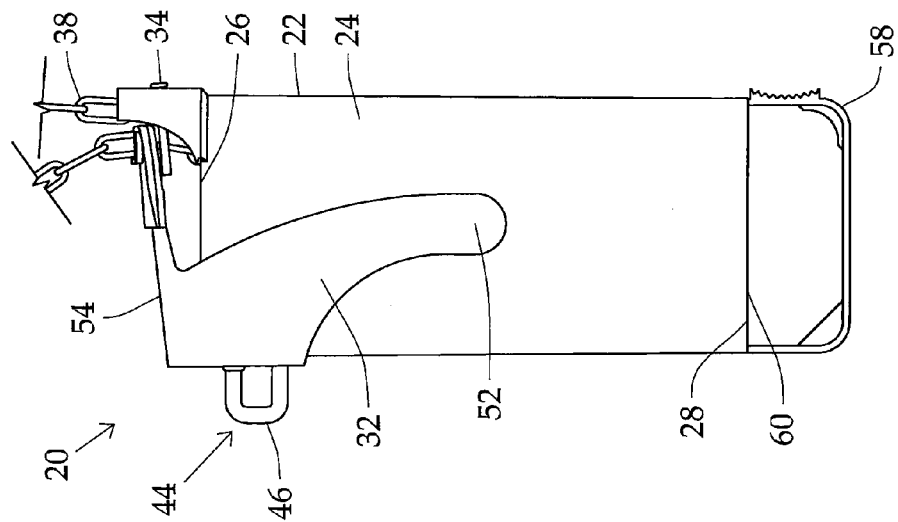
FIG. 8 is another alternate embodiment of the present invention in the closed position.

Another embodiment of the present invention, see FIG. 8, has the axis of pivot 52 and closure mechanism 44 located on opposite or adjacent sides of the portion 54 of the lid 32 that extends across the open end 26 of the body 22.

The lockout device 20 of the present invention may have additional features that adds to its functionality. These added features may include one or more apertures 56 through the bottom 28 of the body 22. These allow any liquids that may have fallen into the interior volume 30 to drain, thus reducing the possibility of corrosion of the valve chain 38 contained in the interior volume 30.

The lockout device 20 may also be equipped with a handle 58. This provides ease of use for the operator. The embodiments shown in the drawings have the handle 58 extending across the exterior bottom 60 of the lockout device 20. However the handle 58 could also be located on other surfaces of the device 20.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A lockout device for a chain wheel valve operator, said device comprising:
   a body having one or more sidewalls, an open end and a bottom, the one or more sidewalls being continuous with one another, the open end opposing the bottom and the one or more side walls, open end and bottom end defining an interior volume, the interior volume being generally cylindrical and capable of receiving a chain from the chain wheel valve operator;
   a pin extending from one of the one or more sidewalls;
   a lid pivotally attached to at least one of the sidewalls and located to cover at least a portion of the open end;
   a closure mechanism capable of holding the lid stationary relative to the one or more continuous sidewalls; and
   an axis of pivot for the lid being located between the closure mechanism and a portion of the lid that extends across the open end of the body when the lid is in a closed position.

2. A lockout device according to claim 1, further comprising one or more openings in the bottom.

3. A lockout device according to claim 1, further comprising a handle located on an exterior surface of the lockout device.

4. A lockout device according to claim 3, further comprising the handle extending across an exterior bottom of the body.

5. A lockout device according to claim 1, said closure mechanism comprising:
   a loop mounted to an exterior surface of the lockout device and extending from the same exterior surface; and
   an aperture in the lid sized and located to surround the loop in a closed position.

6. A lockout device according to claim 1, further comprising a gap between one of the sidewalls and the lid and the pin extending across the gap and under the lid.

7. A lockout device according to claim 6, further comprising the pin extending downwardly at an angle of less than 90 degrees relative to the sidewall.

8. A lockout device according to claim 6, further comprising the pin extending downwardly at an angle within the range of 85 to 40 degrees relative to the sidewall.

9. A lockout device for a chain wheel valve operator, said device comprising:
   a body having one or more sidewalls, an open end and a bottom, the one or more sidewalls being continuous with one another, the open end opposing the bottom and the one or more side walls, open end and bottom end defining an interior volume, the interior volume being generally cylindrical and capable of receiving a chain from the chain wheel valve operator;
   a pin extending from one of the one or more sidewalls;
   a lid pivotally attached to at least one of the sidewalls by an axis of pivot, the lid located to cover at least a portion of the open end when the lid is in a closed position; and
   a closure mechanism capable of holding the lid in the closed position and stationary relative to the one or more sidewalls;
   wherein the lid's axis of pivot is located between the closure mechanism and the portion of the lid that covers a portion of the open end of the body.

\* \* \* \* \*